Sept. 11, 1934.  E. A. LARSSON  1,973,570
COUPLER
Filed Dec. 26, 1929
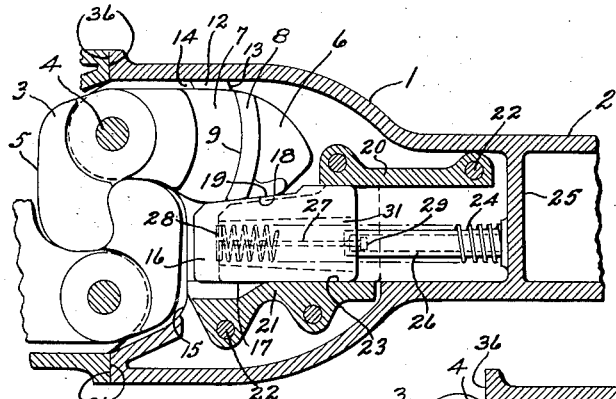
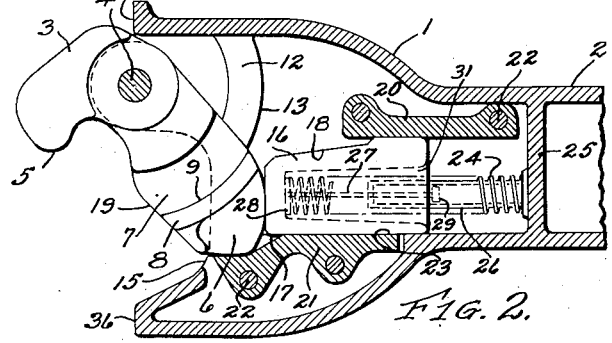
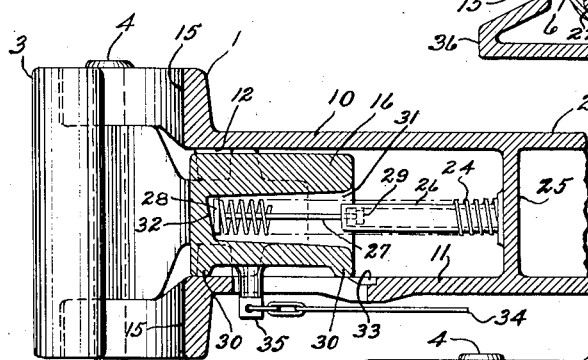
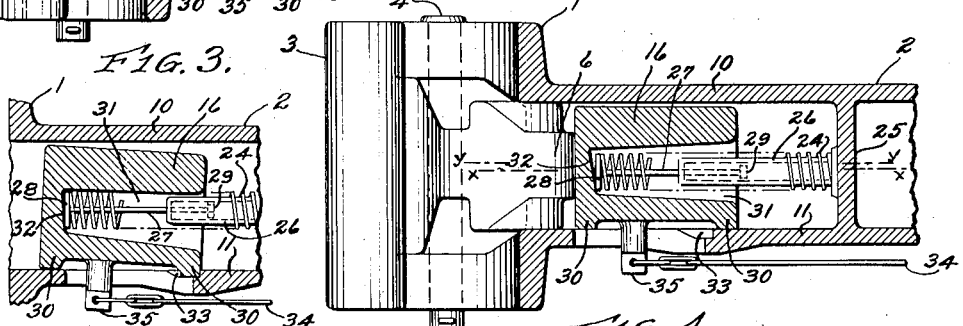
Inventor
ERNST A. LARSSON
Attorney Patented Sept. 11, 1934

1,973,570

UNITED STATES PATENT OFFICE 1,973,570

COUPLER

Ernst A. Larsson, Mansfield, Ohio, assignor to The Ohio Brass Company, Mansfield, Ohio, a corporation of New Jersey Application December 26, 1929, Serial No. 416,389

9 Claims. (Cl. 213—149)

My invention relates to couplers for cars and particularly for mechanically coupling the cars together.

The object of my invention is to provide a simple coupler and one which will maintain two coupled heads in coupled relation without relative movement in a longitudinal direction. A further object of my invention is to provide means of taking up any slack between two coupled heads due to wear in the various parts. A further object of my invention is to prevent uncoupling due to the lock being moved out of its locking position and which often happens with the present type of tapered gravity locks.

My invention resides in the new and novel construction, combination and relation of the various parts hereinafter described and shown in the accompanying drawing.

In the drawing:—

Fig. 1 is a top view in partial section of my improved coupler head shown connected to the knuckle of a co-operating head.

Fig. 2 is a plan view in partial section of my improved head showing the knuckle in an opened position.

Fig. 3 is a side view in partial section of my improved head showing the relation of the lock to the other parts when the head is coupled operating under normal conditions, as in Fig. 1.

Fig. 4 is a side view in partial section of my invention showing the relation of the lock to other parts when the knuckle is in the open position as in Fig. 2.

Fig. 5 is a fragmentary view in section showing the relation of the lock to the body when the lock may have been forced back while operating under normal conditions.

In the preferred embodiment of my invention I employ a body member 1 having tail portion 2 for connecting to a draft gear. Pivotally mounted in the open end of the body 1 is a knuckle 3. The pivotal pin is shown as 4. The contour of the hook portion 5 may be of standard MCB or ARA types or other suitable contour. The knuckle 3 is provided with a tail portion 6 of the usual type. The tail 6 is provided with a groove portion 7 formed by the rib 8 which may be upon the upper and lower faces of the tail 6 and the surface 9 may be an arc with the center of radius coinciding with that of the pin 4.

Upon the inner surface of the upper and lower walls 10 and 11 are raised ribs 12 having a face 13 formed with the center of the pin 4 as its center of radius and when the knuckles are closed, face 9 will engage with the surface 13, thus relieving the pin 4 of tension strain upon two coupled heads.

The tail 6 of the knuckle is so formed that a space 14 exists between the tail and the body when the knuckle is in its fully closed position and when in such position the knuckles of two operating heads will be closely interlocked with each other and with the body and prevent any lost motion or relatively longitudinal movement between the heads in a longitudinal direction. If there is wear in any of the parts as for instance the knuckle 3, the pin 4 or the face 15 of the body then such wear may be taken up through movement of the tail portion 6 toward the side wall of the body 1 thus reducing the space 14.

In order to maintain the knuckles in closed position, each head would be provided with a longitudinally sliding lock 16 having a face 17 parallel with the direction of movement of the lock 16 and having a face 18 angularly disposed to the face 17 and to the direction of movement of the lock. The tail 6 will have a face 19 which will be made to have the same angularity as that of the face 18 of a new head and when the head is in coupled relation with a co-operating head. This uniform angularity of the surfaces 18 and 19, however, is not essential for the successful operation of the coupler. The lock 16 slides forwardly and backwardly between the guides 20 and 21 which extend between the upper and lower horizontal sides of the coupler head and are preferably separately formed and held in place by the through pins 22.

The member 21 has a face 23 engaged by the face 17. The member 21 takes the side thrust of the lock 16 due to the pressure of the knuckle thereon. The spring 24 interposed between the back wall 25 and the lock 16 tends constantly to move the lock 16 to a forward position. The spring 24 rides upon the center guide composed of the tubular member 26 which has one end secured to the back wall 25 and a rod 27 projecting from the free end of the tube 26 and having an end plate 28 secured thereto and a nut 29 also secured thereto by means of which the relation of the rod 27 to the tube 26 may be shortened or lengthened.

The lock 16 is provided with two ridges 30 which support the lock 16 upon the lower horizontal wall 11. The lock 16 has a longitudinal disposed pocket 31 with a sloping back wall 32 with the forward end of the sloping wall at the top. The plate 28 under normal operation when the two heads are coupled will engage the lower portion of the face 32 and the tendency of the spring pressure upon the lower edge of the face 32 will be to throw the forward end of the lock slightly upwardly and the rear end downwardly into engageable relation with the stop on the body while simultaneously urging the lock forward to engage the knuckle.

When two heads are coupled as shown in Fig. 1 the lock 16 will be in the position shown in Fig. 3, but should there be a tendency for the lock 16 to be retracted, then such retraction may take place until the rear lug 30 drops into the transverse recess 33 as shown in Fig. 5, thus preventing further retraction of the lock 16 beyond the limit set by the recess 33 and such recess is so positioned that engagement between the lock 16 and the tail 6 will still be maintained. The lug 30 will be assisted in dropping into the recess 33 not only through the weight of the rear portion of the lock 16, but also through the already explained action of the spring upon the obliquely disposed forward face 32 of the pocket 31.

In order to uncouple two heads, as is well known, it is only necessary with the Janney type of coupler to move only one knuckle to its open position and this may be brought about by a rearward pull upon the rod 34 which is transmitted to the downwardly projecting lug 35 secured to the lock 16 and which will have a tendency to simultaneously pivot the lock 16 about the forward lug 30 and also move the lock 16 rearwardly and the rotation of the lock 16 about the forward lug 30 will either release the rear lock 30 from the recess 33 or prevent such lock from dropping into the recess 33 if uncoupling takes place when the lock 16 is in the position shown in Fig. 3.

The pulling apart of the cars will cause the released knuckle to swing about its pin 4 and take the position shown in Fig. 2 and when the uncoupling rod 34 is released, the spring 24 will move the lock 16 forwardly and into engagement with the rear wall of the tail 6. If two heads are brought together with one head having its knuckle closed and the other open as in Fig. 2, the closed knuckle will engage the forward face 19 of the knuckle 16 and force the knuckle 16 into its coupled position as shown in Fig. 1 and the lock will assume the position shown in Fig. 1 and will exert a continuous effort to rotate the knuckle about its pin 4 thus moving the portion 5 inwardly in contact with the portion 5 of the co-operating knuckle and which co-operating knuckle will be forced into contact with the face 15 of the head. Where both heads are equipped alike then the action of both heads is similar and the heads will be drawn into a tight relation and held there against relative longitudinal movement with the body faces 36 held in close engagement.

Another feature of my invention to insure the rear end of the lock 16 being thrown downward is to place the axis X—X of the spring 24 and rod 27 below the center line Y—Y of the bearing between the knuckle and the lock, that is the forces tending to move the lock back are centralized along the center of bearing Y—Y between the lock and knuckle tail and the force of the spring 24 tending to move the lock forward is along the line X—X and these two forces form a couple tending to rotate the rear end of the lock downward. Further it may be said that the point of application of the spring force upon the lock 16 should be below the point of application of the opposing force between the lock and knuckle tail.

Modifications will manifest themselves to those skilled in the art based upon the disclosure I have made herein, therefore I wish to be limited only by my claims.

Therefore I claim:—

1. A coupler comprising a body, a knuckle and locking mechanism, the locking mechanism movable into and out of locking relation with the knuckle and a spring constantly urging the locking mechanism into locking relation with the knuckle, means interposed between the body and locking mechanism to space the body and locking mechanism and to form a pivot for the locking mechanism and separate means on the body and locking mechanism to co-operate to limit the unlocking movement of the locking mechanism.

2. A coupler comprising a body, a knuckle and a lock, movable into and out of engagement with the knuckle to move it to closed position or to release it respectively, one end of the locking mechanism having a slidable pivotal engagement with the body and the other end having means to engage a stop on the body, means to engage the means on the locking mechanism with the stop and means operable at will to move the locking mechanism about its pivotal engagement and release the locking mechanism from the stop.

3. A coupler comprising a body, a knuckle and a lock to wedge the knuckle to closed position when the lock moves in one direction, means to pivot the lock in one direction relative to the body when the lock has moved in another direction a limited amount and means to limit the amount of movement in said other direction, means secured to the lock and projecting through a slot in the body and means secured to said projection to pivot the lock in the other direction at will and move the lock out of range of the knuckle to permit the knuckle to open.

4. A coupler of the Janney type having a body, a knuckle and horizontally movable locking means to engage the knuckle to move it to and hold it in its closed position, means on the body to be automatically engaged by the locking means to limit the movement of the locking means in an uncoupling direction of the locking means to prevent the accidental releasing of the knuckle and a spring which engages means on the lock to urge the locking means forward and operating to effect the engagement of the said locking means with the body.

5. A coupler comprising a body, a pivotally mounted knuckle, a horizontally movable locking mechanism to engage and hold the knuckle in the locked position, stop means engaged by the locking mechanism to limit the releasing movement of the locking mechanism short of releasing the knuckle and a spring urging the locking mechanism into engagement with the knuckle and also into engagement with said stop means as the locking means moves to its unlocking position.

6. A coupler comprising a body, a knuckle and a locking mechanism, a stop for said locking mechanism, the locking mechanism comprising a movable member to engage the knuckle and having a recess closed at one end by a wall having a tapered face and a spring engaging that portion of the tapered face below the horizontal center line of the spring, the spring operating to move the locking mechanism to its locking position and to yieldingly hold the end of the locking mechanism opposite the said wall in position to engage with the stop to prevent the unintentional uncoupling of the coupler from a co-operating coupler should the locking mechanism accidentally move backward.

7. A coupler comprising a body, a knuckle, a locking mechanism to move the knuckle to its closed position and so hold it, a spring urging the locking means in a coupling direction and means to limit the said urging of the spring against the locking mechanism and other means to limit the unintentional movement of the locking mechanism in an uncoupling direction to prevent unintentional release of the knuckle.

8. A coupler comprising a body, a knuckle and locking mechanism, a movement-limiting stop on the body, the locking mechanism movable into and out of locking relation with the knuckle and a spring constantly urging the locking mechanism into locking relation with the knuckle, spaced projections upon one side of the locking mechanism to engage an interior face of the body and the locking mechanism being pivotal about one of said projections to bring the locking mechanism into engagement with the movement-limiting stop to prevent unintentional release of the knuckle.

9. A coupler comprising in combination a head, a coupling knuckle pivotally mounted on the head, a combined movable wedge lock and catch to alternately engage and disengage the knuckle either to hold it in its locked position or to release the knuckle respectively, stop means associated with the head to be engaged by the combined lock and catch to prevent accidental withdrawal of the lock and catch while the knuckle is closed, yielding means tending to constantly advance the lock and catch to the knuckle-closed position, and means associated with the lock and catch to enable the lock and catch to pivot relatively to the body and the aforesaid stop means to permit the lock and catch to engage the stop means and means for pivoting the lock and catch out of engageable relation to the stop means and to withdraw the wedge lock and catch at will.

ERNST A. LARSSON.